United States Patent
Lee et al.

(10) Patent No.: US 12,474,456 B2
(45) Date of Patent: Nov. 18, 2025

(54) VEHICLE ULTRASONIC SENSOR CONTROL SYSTEM AND CONTROL METHOD

(71) Applicant: HYUNDAI MOBIS CO., LTD., Seoul (KR)

(72) Inventors: Tae Ho Lee, Yongin-si (KR); Young Hoon Kim, Seongnam-sI (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 382 days.

(21) Appl. No.: 17/682,013

(22) Filed: Feb. 28, 2022

(65) Prior Publication Data

US 2022/0299615 A1 Sep. 22, 2022

(30) Foreign Application Priority Data

Mar. 17, 2021 (KR) .................. 10-2021-0034873
Mar. 17, 2021 (KR) .................. 10-2021-0034874

(51) Int. Cl.
- G01S 7/524 (2006.01)
- G01S 7/52 (2006.01)
- G01S 15/931 (2020.01)

(52) U.S. Cl.
CPC .......... *G01S 7/524* (2013.01); *G01S 7/52006* (2013.01); *G01S 15/931* (2013.01)

(58) Field of Classification Search
CPC ..... G01S 7/524; G01S 7/52006; G01S 15/931
See application file for complete search history.

(56) References Cited

U.S. PATENT DOCUMENTS

| | | | | |
|---|---|---|---|---|
| 5,235,316 A | * | 8/1993 | Qualizza | G01S 15/931 367/87 |
| 6,573,732 B1 | * | 6/2003 | Reimer | G01F 23/2962 324/644 |
| 2013/0081469 A1 | * | 4/2013 | Kim | G01S 15/107 73/628 |

(Continued)

FOREIGN PATENT DOCUMENTS

| CN | 102469985 A | 5/2012 |
|---|---|---|
| CN | 103797379 A | 5/2014 |

(Continued)

OTHER PUBLICATIONS

Extended European Search Report issued on Aug. 22, 2022 in corresponding European Patent Application No. 22158813.0.
(Continued)

*Primary Examiner* — Anne Marie Antonucci
*Assistant Examiner* — Luis G Del Valle
(74) *Attorney, Agent, or Firm* — NovoTechIP International PLLC

(57) ABSTRACT

The present invention discloses a vehicle ultrasonic sensor control system including an ultrasonic sensor including an ultrasonic transducer generating ultrasonic waves and a control module controlling driving frequency of the ultrasonic waves emitted from the ultrasonic transducer, wherein a plurality of ultrasonic sensors are mounted on the outside of the vehicle; and a control unit setting a plurality of driving frequencies with a guard-band formed in between and controlling a control module so that the plurality of ultrasonic sensors emit and receive ultrasonic waves having driving frequencies different from each other.

17 Claims, 11 Drawing Sheets

(56) References Cited

U.S. PATENT DOCUMENTS

| | | | |
|---|---|---|---|
| 2015/0078130 A1* | 3/2015 | Urban | G01S 15/04 |
| | | | 367/93 |
| 2015/0268335 A1* | 9/2015 | Nakano | G01S 7/529 |
| | | | 367/13 |
| 2018/0067207 A1 | 3/2018 | Bang | |
| 2019/0107420 A1* | 4/2019 | Kincel | G01F 1/667 |
| 2019/0339370 A1* | 11/2019 | Watanabe | G01H 13/00 |
| 2020/0142044 A1* | 5/2020 | Matsuura | G01S 15/931 |
| 2021/0018621 A1* | 1/2021 | Iske | G01S 15/931 |
| 2021/0352413 A1* | 11/2021 | Gebhart | H04R 17/10 |
| 2022/0113171 A1* | 4/2022 | Ikenishi | G01S 7/4004 |

FOREIGN PATENT DOCUMENTS

| | | |
|---|---|---|
| CN | 107884774 A | 4/2018 |
| DE | 19901847 A1 | 2/2000 |
| DE | 102011118643 A1 | 5/2013 |
| DE | 102013218571 A1 | 3/2015 |
| EP | 1724925 A1 | 11/2006 |
| KR | 20050120473 A | 12/2005 |

OTHER PUBLICATIONS

Office Action issued on Apr. 27, 2025 in corresponding Chinese Patent Application No. 202210266069.3.

\* cited by examiner

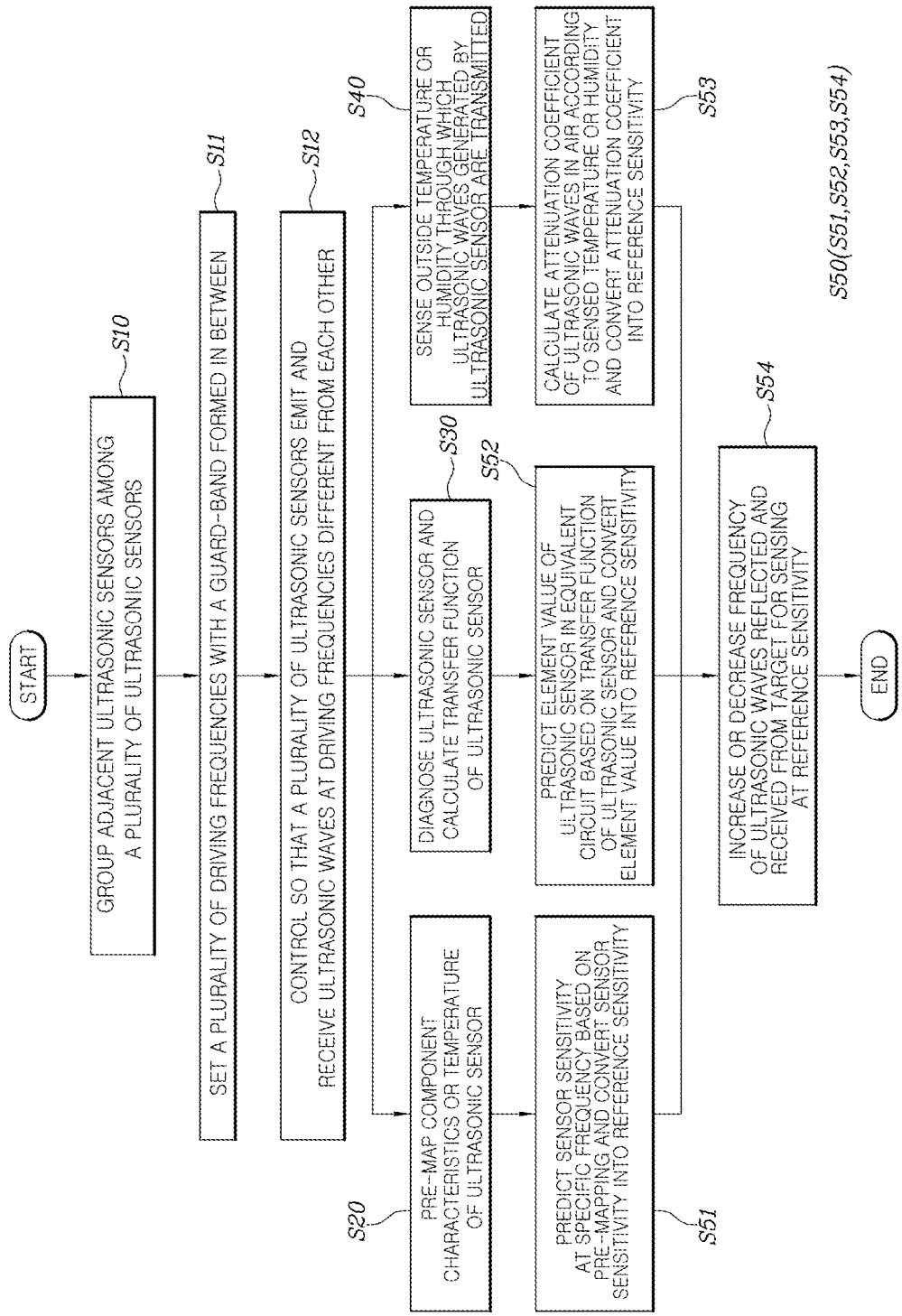

VEHICLE ULTRASONIC SENSOR CONTROL SYSTEM AND CONTROL METHOD

CROSS-REFERENCE TO RELATED APPLICATIONS

The present application claims priority to Korean Patent Application No. 10-2021-0034873, filed Mar. 17, 2021 and to Korean Patent Application No. 10-2021-0034874, filed Mar. 17, 2021, the entire contents of which is incorporated herein for all purposes by this reference.

BACKGROUND

1. Technical Field

The present invention relates to a technology for controlling a vehicle ultrasonic sensor using a plurality of frequencies.

2. Discussion of Related Art

In general, collision avoidance devices developed to prevent car accidents mostly measure the distance to neighboring vehicles in a non-contact manner using ultrasonic waves, radio waves, or images and prevents accidents by automatically braking or warning a driver when the distance between a host vehicle and a neighboring vehicle reduces to or below the safe distance.

Such devices preset the safe distance tailored to various situations in consideration of the speed of the host vehicle, the moving speed of, and distance to, the neighboring vehicle or object, the braking distance of the vehicle, the human response time, and the like, analyzes the situations while the vehicle is driving, and warns the driver or automatically brakes when the distance between the host vehicle and front vehicle reduces to or below the preset safe distance.

In particular, an ultrasonic sensor 100 is used to assist driving while the vehicle is in motion but is more often used to detect neighboring vehicles or objects around the vehicle during parking, and the use of the sensor is greatly expanding from measuring a parking distance to remote parking, emergency braking during parking, and the like.

Accordingly, a plurality of ultrasonic sensors is provided in the vehicle and a single frequency is employed according to the frequency sensitivity/characteristics of the vehicle, thereby posing the problem of the reduced response and update time of data.

The matters described above as a technical background are intended only for a better understanding of the background of the present invention and are not to be taken as acknowledgment that they pertain to the conventional art already known to those skilled in the art.

SUMMARY

The present invention is proposed to address the issue described above and aims to drive a plurality of ultrasonic sensors provided in a vehicle at a plurality of frequencies.

An ultrasonic sensor control system for a vehicle according to the present invention includes an ultrasonic sensor including an ultrasonic transducer generating ultrasonic waves and a control module controlling the driving frequency of ultrasonic waves emitted from the ultrasonic transducer, wherein a plurality of ultrasonic sensors are mounted on the outside of the vehicle; and a control unit setting a plurality of driving frequencies with a guard-band formed in between and controlling a control module so that the plurality of ultrasonic sensors emit and receive ultrasonic waves having driving frequencies different from each other.

The control unit may group adjacent ultrasonic sensors among the plurality of ultrasonic sensors and set the plurality of grouped ultrasonic sensors to the driving frequencies different from each other.

The control module may include a filter with a cutoff frequency set to filter the received ultrasonic waves, and the control unit may set the guard-band according to the characteristics of the filter.

The filter may include a bandpass filter passing frequencies within a preset frequency bandwidth only, and the control unit may set the guard-band to a value greater than the frequency bandwidth preset in the bandpass filter The frequency band preset in the bandpass filter may be preset to frequencies in a band in which voltage transduced in the ultrasonic transducer reduces by half.

The frequency band preset in the bandpass filter may be preset by a Q factor and a center frequency of a frequency of the ultrasonic waves.

The filter may include a matched filter determining whether a received driving frequency is a valid frequency based on common elements between a preset reference frequency and the received driving frequency, and the control unit may set the guard-band based on the preset reference frequency.

The control unit may select a plurality of frequencies at a driving frequency point and set the plurality of frequencies.

The control unit may set a plurality of frequencies through frequency modulation.

The control unit may compensate the sensitivity of the ultrasonic waves reflected and received from a target and control the control module for sensing the target.

The control unit may set the reference sensitivity of the frequency of the received ultrasonic waves and increase or decrease the frequency of the ultrasonic waves reflected and received from the target for sensing at the reference sensitivity.

The control unit may pre-map the component characteristics and temperature of the ultrasonic sensor, predict the sensor sensitivity at a specific frequency based on the pre-mapping, and convert the sensor sensitivity into the reference sensitivity for sensing.

A sensor diagnosis unit diagnosing the ultrasonic sensor and calculating a transfer function of the ultrasonic sensor may be further included, and the control unit may predict an element value of the ultrasonic sensor in an equivalent circuit based on the transfer function of the ultrasonic sensor calculated by the sensor diagnosis unit and convert the element value into the reference sensitivity for sensing.

A sensing unit sensing the outside temperature or humidity through which the ultrasonic waves generated by the ultrasonic sensor are transmitted may be further included, and the control unit may calculate an attenuation coefficient of the ultrasonic waves in the air according to the temperature or humidity sensed by the sensing unit and convert the attenuation coefficient into the reference sensitivity for sensing.

The vehicle ultrasonic sensor control method according to the present invention may include setting a plurality of driving frequencies with a guard-band formed in between; controlling so that a plurality ultrasonic sensors emit and receive the ultrasonic waves having the set driving frequencies different from each other; and compensating the sensitivity of the ultrasonic waves reflected and received from the target for sensing the target.

Grouping adjacent ultrasonic sensors among the plurality of ultrasonic sensors before the setting of the driving frequency may be further included, and the plurality of grouped ultrasonic sensors may be set to the driving frequencies different from each other in the controlling.

Setting reference sensitivity of the frequency of the received ultrasonic waves and increasing or decreasing the frequency of the ultrasonic waves reflected and received from the target for sensing may be included in the sensing of the target.

Pre-mapping the component characteristics and temperature of the ultrasonic sensor may be further included, and predicting the sensor sensitivity at a specific frequency based on the pre-mapping and converting the sensor sensitivity into the reference sensitivity for sensing may be included in the sensing of the target.

Diagnosing the ultrasonic sensor and calculating the transfer function of the ultrasonic sensor may be further included, and predicting the element value of the ultrasonic sensor in the equivalent circuit based on the transfer function of the ultrasonic sensor calculated by the sensor diagnosis unit and converting the element value into the reference sensitivity for sensing may be included in the sensing of the target.

Sensing the outside temperature or humidity through which the ultrasonic waves generated by the ultrasonic sensor are transmitted may be further included, and calculating the attenuation coefficient of the ultrasonic waves in the air according to the sensed temperature or humidity and converting the attenuation coefficient into the reference sensitivity for sensing may be included in the sensing of the target.

The vehicle ultrasonic sensor control system according to the present invention drives a plurality of ultrasonic sensors provided in the vehicle using a plurality of frequencies, thereby allowing the effect of shortening the update time of sensed data from the ultrasonic sensors.

In addition, grouping adjacent ultrasonic sensors of the vehicle and driving the plurality of grouped ultrasonic sensors at frequencies different from each other reduce the number of the plurality of frequencies so that an ultrasonic transducer having a relatively narrow band is used, thereby allowing the effect of the cost reduction.

In addition, driving the plurality of ultrasonic sensors at the plurality of frequencies has the effect of shortening the update time of sensed data from the ultrasonic sensor, and the use of a plurality of frequencies allows the effect of accurately receiving sensed data by adjusting the frequency sensitivity of the received ultrasonic wave.

In addition, pre-mapping the frequency sensitivity for each frequency characteristic, diagnosing the ultrasonic sensor to calculate the transfer function of the sensor, and sensing the temperature or humidity or the medium through which the ultrasonic waves are transmitted to adjust the frequency sensitivity allow the effect of accurately receiving the sensed data.

BRIEF DESCRIPTION OF THE DRAWINGS

FIG. 11 is a flowchart of a vehicle ultrasonic sensor control method according to an embodiment of the present invention.

DETAILED DESCRIPTION

Figure 1:
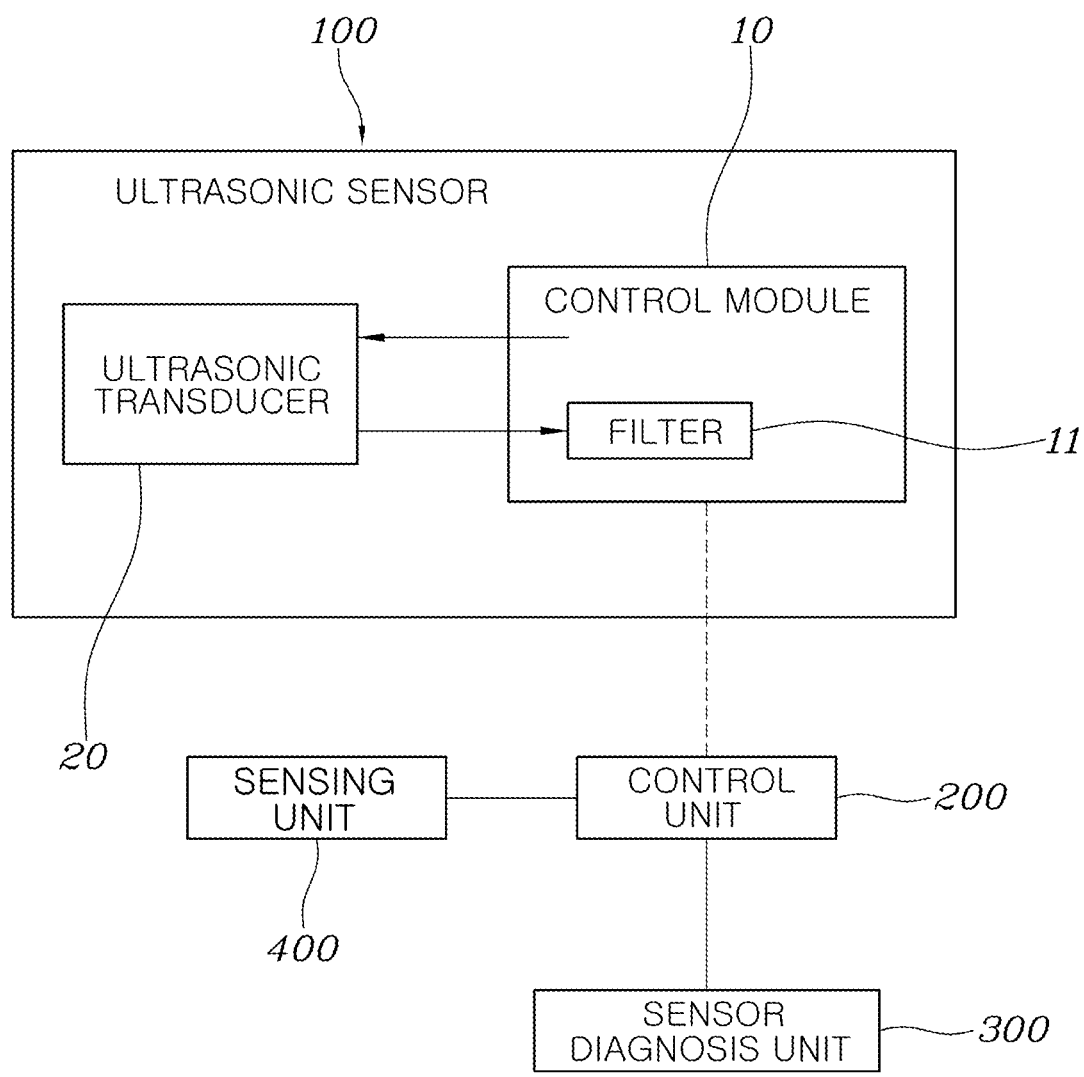
FIG. 1 is a block diagram showing a vehicle ultrasonic sensor control system according to an embodiment of the present invention.

Specific structural or functional descriptions of the embodiments of the present invention disclosed in the present specification or application existed by way of examples only for the purpose of describing the embodiments according to the present invention, and the embodiments according to the present invention may be implemented in various forms and are not to be construed as being limited to the embodiments described in the present specification or application.

Since the embodiment of the present invention may be modified in various ways and have various forms, specific embodiments will be illustrated in the drawings and described in the present specification or application. However, this is not intended to limit the embodiments according to the concept of the present invention to the specific forms and is to be construed as including all modifications, equivalents, and substitutes included in the spirit and technical scope of the present invention.

Terms such as first and/or second may be used to describe various components, but the components are not to be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the other component, but it is to be understood that other components may exist in between. On the other hand, when a component is referred to as being "directly connected" or "directly coupled" to another component, it is to be understood that there are no intervening components present. Other expressions describing the relationship between components such as "between" and "just between," or "adjacent to" and "directly adjacent to" are to be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, is to be interpreted as having a meaning that is consistent with their meaning in the context of the present specification, and will not be interpreted in an idealized or overly formal sense unless expressly so defined herein.

In the following, the present invention will be described in detail by describing preferred embodiments of the present invention with reference to the accompanying drawings. The same reference numerals shown in each drawing indicate the same members.

A control unit 200 according to an exemplary embodiment of the present invention may be implemented through a processor (not shown) configured to perform operations to be described below using an algorithm configured to control the operations of various components of a vehicle or a nonvolatile memory (not shown) configured to store data relating to software commands for reproducing the algorithm and the data stored in the memory. Here, the memory and the processor may be implemented as individual chips. Alternatively, the memory and the processor may be implemented as a single integrated chip. The processor may take the form of one or more processors.

Figure 2:
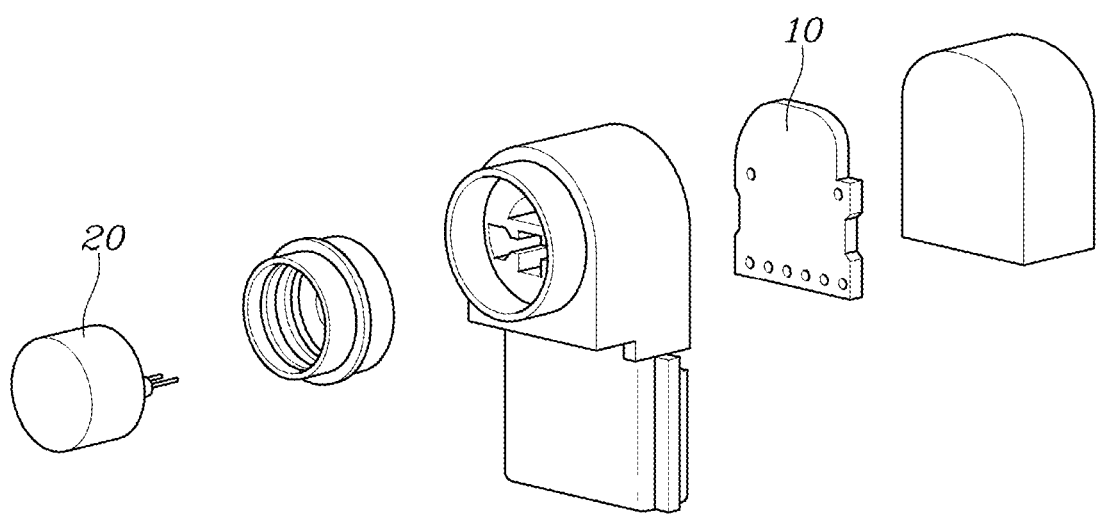
FIG. 2 is a perspective view showing a vehicle ultrasonic sensor according to an embodiment of the present invention.
Figure 3:
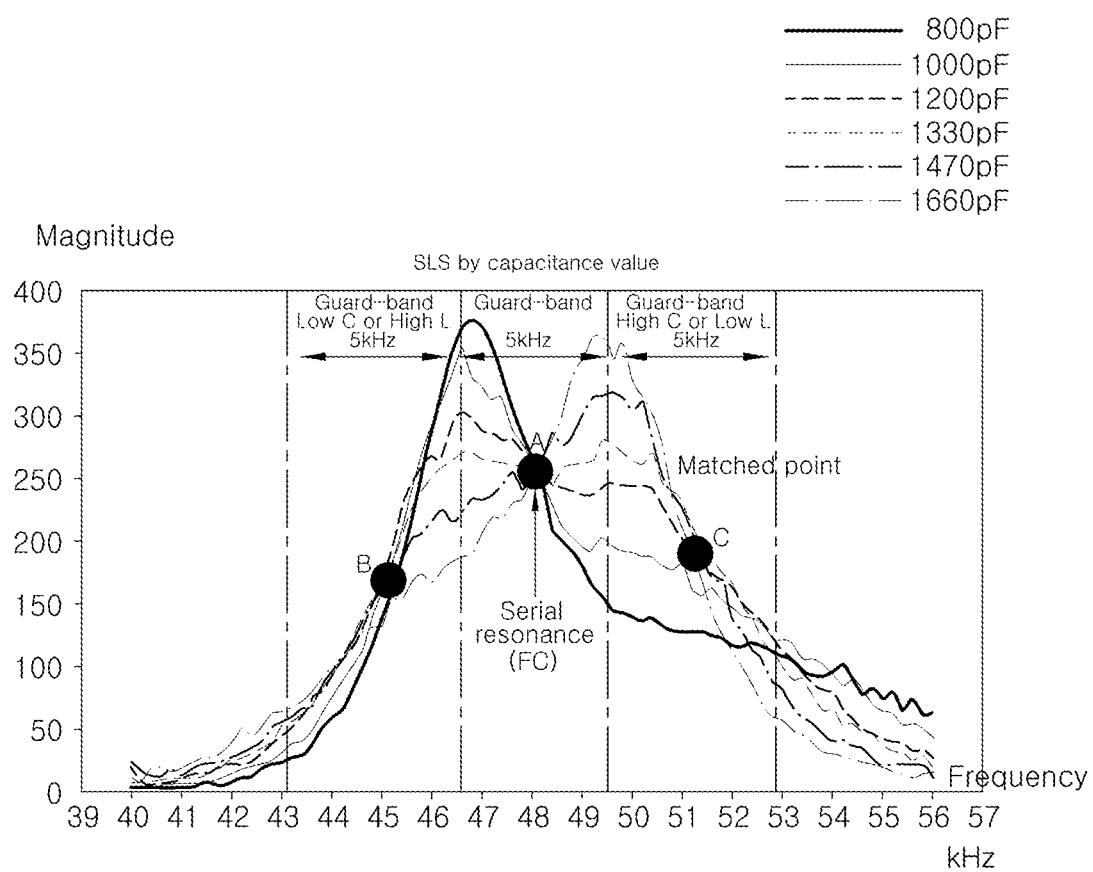
FIG. 3 is a graph showing frequency characteristics of each driving frequency according to an embodiment of the present invention.
Figure 4:
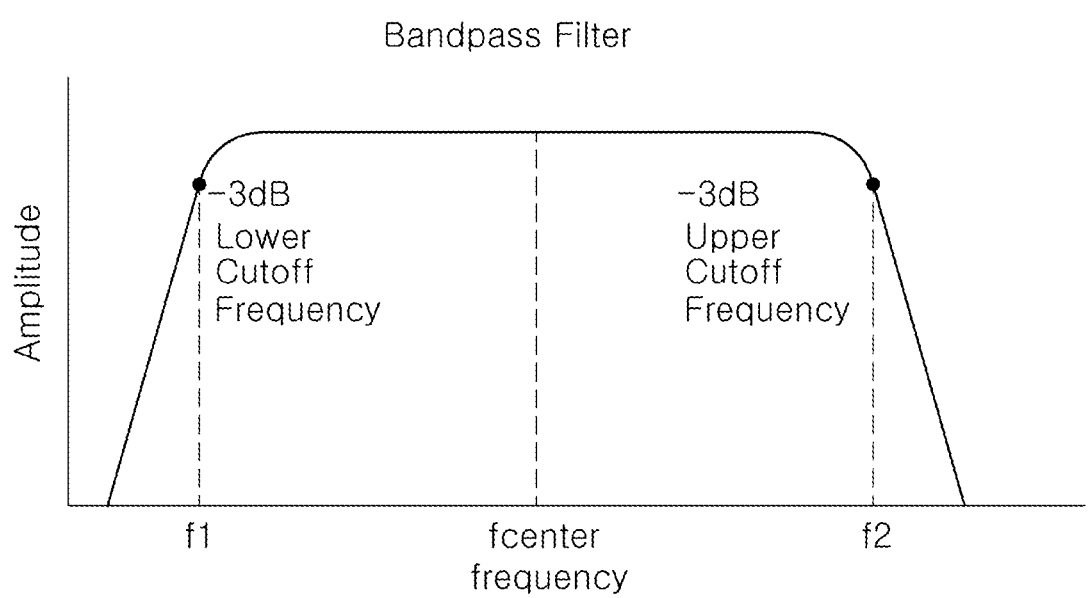
FIG. 4 is a graph showing the frequency characteristics of a bandpass filter.
Figure 5:
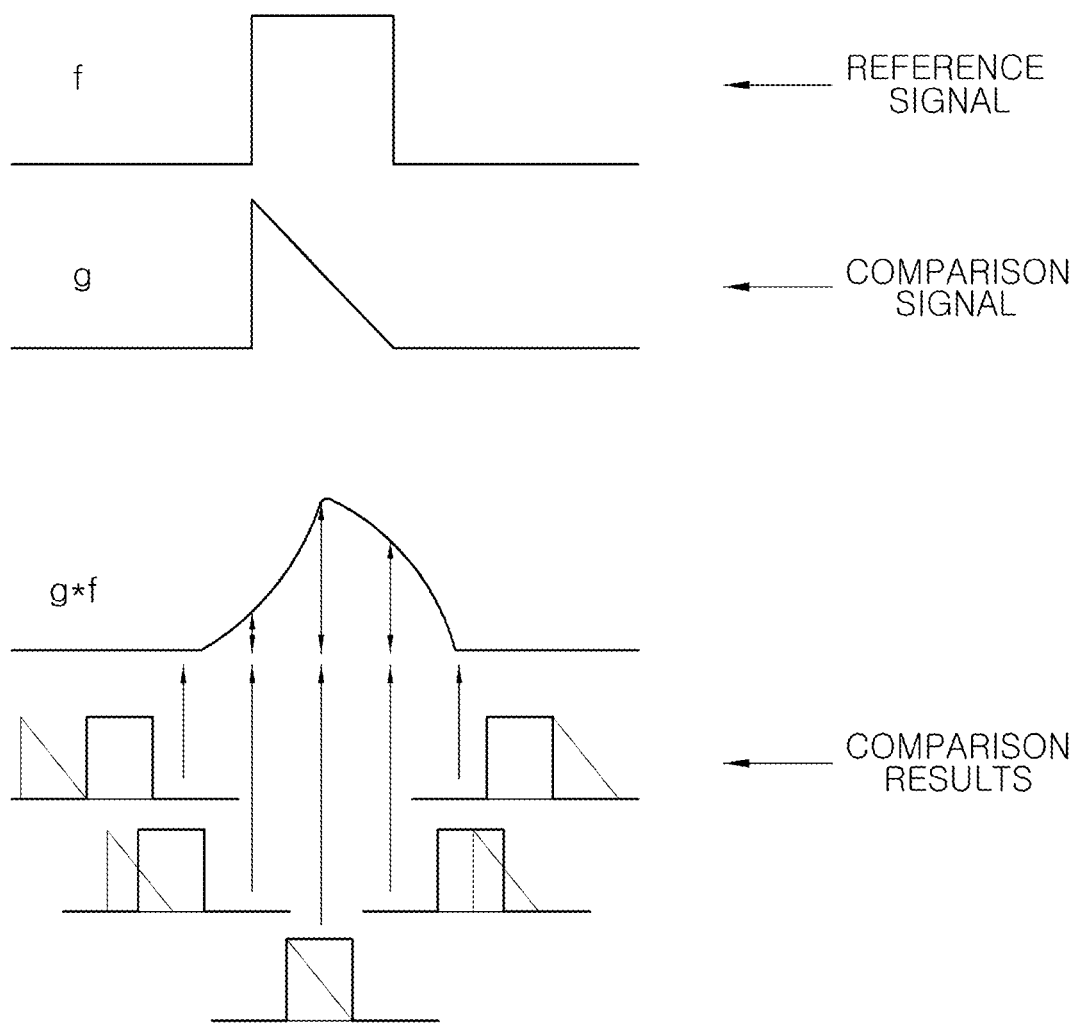
FIG. 5 is a graph showing the frequency characteristics of a matched filter.
Figure 6:
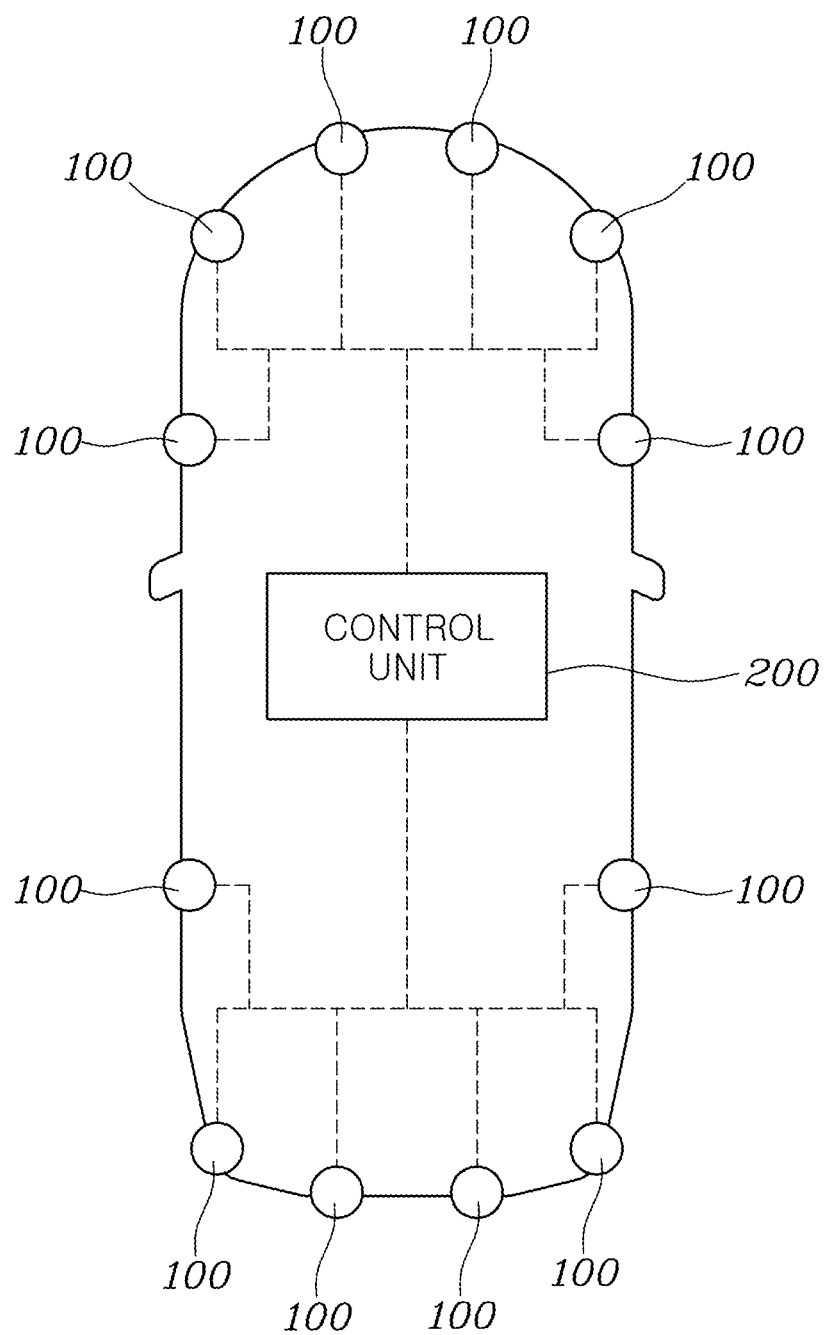
FIG. 6 is a view showing mounting positions of vehicle ultrasonic sensors according to an embodiment of the present invention.

FIG. 1 is a block diagram showing a vehicle ultrasonic sensor 100 control system according to an embodiment of the present invention; FIG. 2 is a perspective view showing a vehicle ultrasonic sensor 100 according to an embodiment of the present invention; FIG. 3 is a graph showing frequency characteristics of each driving frequency according to an embodiment of the present invention; FIG. 4 is a graph showing frequency characteristics of a bandpass filter 11; FIG. 5 is a graph showing frequency characteristics of a matched filter 11; and FIG. 6 is a view showing mounting positions of vehicle ultrasonic sensors 100 according to an embodiment of the present invention.

Preferable embodiments of a vehicle ultrasonic sensor 100 control system according to the present invention will be described with reference to FIGS. 1 to 6.

An ultrasonic transducer 20 employed in the ultrasonic sensor 100 may be driven by attaching a piezoelectric element (oscillator) to an aluminum case to emit and receive ultrasonic waves. At this time, one resonance point exists in the driving frequency band according to the frequency characteristics of the piezoelectric element and the greatest sensitivity is sensed at the resonance point. Accordingly, the conventional ultrasonic sensor 100 used only one frequency.

However, since a plurality of ultrasonic sensors 100 are mounted in a vehicle, use of one frequency necessitates sequential driving of the plurality of ultrasonic sensors 100 to avoid signal interference among the sensors during measurement, and this posed a problem of prolonged time in measurement and data update.

In order to solve the problem described above, the vehicle ultrasonic sensor 100 control system according to the present invention includes an ultrasonic sensor 100 including an ultrasonic transducer 20 generating ultrasonic waves and a control module 10 controlling the driving frequency of the ultrasonic waves emitted from the ultrasonic transducer 20, wherein a plurality of the ultrasonic sensors are mounted on the outside of the vehicle; and a control unit 200 setting a plurality of driving frequencies with a guard-band located therebetween and controlling the control module 10 so that the plurality of ultrasonic sensors 100 emit and receive ultrasonic waves having driving frequencies different from each other.

As shown in FIGS. 1 and 2, the ultrasonic sensor 100 may include the ultrasonic transducer 20 generating and receiving ultrasonic waves and the control module 10 controlling frequency of the ultrasonic waves generated by the ultrasonic transducer 20, in the same configuration as the conventional ultrasonic sensor 100.

The ultrasonic transducer 20 may be configured with an aluminum case and a piezoelectric element to have a resonance point.

When driving the conventional ultrasonic sensor 100, the ultrasonic sensor 100 is driven by applying the burst pulse at the frequency at a serial resonance point Fc at which the sensitivity is the greatest and most stable.

The control unit 200 of the vehicle ultrasonic sensor 100 control system according to the present invention sets the guard-band at the serial resonance point Fc, selects frequencies separated by as much as the guard-band, and sets the plurality of frequencies. Then, the plurality of set frequencies is respectively applied to the plurality of ultrasonic sensors 100 such that the ultrasonic sensors 100 may be driven at frequencies different from each other.

This allows the plurality of ultrasonic sensors 100 to be respectively driven at frequencies different from each other, thereby allowing the effect of shortening the time in measurement and data update.

As shown in FIG. 3, the control unit 200 may select frequencies A, B, and C including a resonance point Fc and having a plurality of guard-band set and drive the ultrasonic sensor 100.

The control unit 200 may group adjacent ultrasonic sensors 100 among the plurality of ultrasonic sensors 100 and set the plurality of grouped ultrasonic sensors 100 to driving frequencies different from each other.

As shown in FIG. 6, a plurality of ultrasonic sensors 100 may be mounted on the front, side, or rear of the vehicle, and the control unit 200 may group adjacent ultrasonic sensors 100 among the plurality of ultrasonic sensors mounted in the vehicle into a plurality of subgroups and respectively drive the grouped ultrasonic sensors 100 at frequencies different from each other.

For example, the control unit 200 may group the ultrasonic sensors 100 on the front, among the six sensors in the front half of the vehicle shown in FIG. 6, into two subgroups with two sensors each, set two ultrasonic frequencies thereafter, and respectively drive the grouped ultrasonic sensors 100 at frequencies different from each other.

This allows the effect of reducing the operating time of the conventional ultrasonic sensor 100 by half.

For example, two frequencies may be used when the ultrasonic sensors 100 are grouped into two subgroups, and three frequencies may be used when the ultrasonic sensors 100 are grouped into three subgroups. There is the effect of shortening the sensing cycle by half when two frequencies are used and by two-thirds when three frequencies are used.

The control module 10 may include the filter 11 with a cutoff frequency set to filter the received ultrasound waves, and the control unit 200 may set the guard-band according to the characteristics of the filter 11.

As shown in FIG. 1, the control module 10 of the ultrasonic sensor 100 may include the filter 11 so that the control module 10 receives the ultrasonic waves emitted from the ultrasonic transducer 20.

The filter 11 may be set to pass the ultrasonic frequency components in a specific band only, and the guard-band may be set by the control unit 200 according to the characteristics of the filter 11 mounted in the ultrasonic sensor 100.

The types of filter 11 may be as follows.

The filter 11 may include a bandpass filter 11 passing frequencies within a preset frequency bandwidth only, and the control unit 200 may set the guard-band to a value greater than the preset frequency bandwidth in the bandpass filter 11.

As shown in FIG. 4, the bandpass filter 11 may be applied to a first embodiment of the filter 11. The bandpass filter 11 is a filter 11 that passes desired frequency components only and has cutoff frequencies f1 and f2 forming the preset frequency bands before and after the bandpass band.

Accordingly, the bandpass filter 11 may pass the frequencies within the cutoff frequencies only.

The frequency band preset in the bandpass filter 11 may be preset to frequencies in a band in which voltage transduced in the ultrasonic transducer reduces by half.

In the preset frequency band of the bandpass filter 11, the frequency at which the voltage reduces by half for accurate reception of the ultrasonic waves, that is, the −3 dB frequency, may be set as the cutoff frequency.

The frequency band preset in the bandpass filter 11 may be preset by a Q factor and a center frequency of a frequency of the ultrasonic waves.

The Q factor is a value indicating the sharpness of resonance in a resonant circuit and is defined as $Q=w0L/R$, where w0 is the resonance angular frequency of the resonant circuit, L is inductance, and R is resistance in the relationship between reactance and resistance. Here, $w0=2\pi f0$, where f0 is the resonance frequency. In addition, the value of the Q factor may be obtained by a formula $Q=Fc/(F2-F1)$ in FIG. 4.

For example, if it is assumed that the bandpass filter 11 having an Fc of 50 kHz and Q=10 is used as shown in FIG. 3, the bandwidth of the driving signal is 5 kHz (±2.5 kHz), and if the number of driving frequencies is assumed to be three, 45 kHz, 50 kHz, and 55 kHz may be selected for use and the bandwidth of the guard-band for the respective driving frequencies is 5 kHz.

The filter 11 may include a matched filter 11 determining whether a received driving frequency is a valid frequency based on common elements between a preset reference frequency and the received driving frequency, and the control unit 200 may set the guard-band based on the preset reference frequency.

As shown in FIG. 5, the matched filter 11 may be used in a second embodiment of the filter 11. When the matched filter 11 is used, a reference signal (reference frequency) and a received signal (received frequency) may be compared to determine whether or not the received signal (received frequency) is a valid signal (frequency) based on the number of common elements.

This allows the advantage of being able to selectively receive an extremely weak and specific signal among many noisy signals.

The control unit 200 may select a plurality of frequencies at a driving frequency point and set the plurality of frequencies.

When setting the plurality of frequencies, the control unit 200 may select one driving point and set the plurality of frequencies using amplitude modulation AM or a burst pulse.

In addition, the control unit 200 may set the plurality of frequencies through frequency modulation FM in another embodiment.

The control unit 200 may set the plurality of frequencies by a modulation method by which the frequency of the carrier wave is changed according to the amplitude of the signal wave.

When the ultrasonic sensor is driven using the present invention, the sensor may be driven in the form of frequency chirp as well as the conventional single-frequency burst pulse. When the ultrasonic sensor is driven in the form of frequency chirp, the frequency band in which the sensor is driven is wider than when the sensor is driven by the single-frequency burst pulse, so that the guard-band needs to be sufficiently secured in consideration of the chirp bandwidth.

The control unit 200 may compensate the sensitivity of the ultrasonic waves reflected and received from a target and control the control module 10 for sensing the target.

As shown in FIGS. 1 and 2, the ultrasonic sensor 100 may include the ultrasonic transducer 20 generating and receiving ultrasonic waves and the control module 10 controlling the frequency of ultrasonic waves generated in the ultrasonic transducer 20.

The ultrasonic transducer 20 may be configured with an aluminum case and a piezoelectric element to have a resonance point.

When driving the conventional ultrasonic sensor 100, the ultrasonic sensor 100 is driven by applying the burst pulse at the frequency at a serial resonance point Fc at which the sensitivity is the greatest and most stable.

The control unit 200 of the vehicle ultrasonic sensor 100 control system according to the present invention sets the guard-band at the serial resonance point Fc and sets a plurality of frequencies by selecting frequencies separated by as much as the guard-band. Then, the plurality of set frequencies is respectively applied to the plurality of ultrasonic sensors 100 such that the ultrasonic sensors 100 may be driven at frequencies different from each other.

This causes the plurality of ultrasonic sensors 100 to be respectively driven at frequencies different from each other, thereby allowing the effect of shortening the time in measurement and data update.

Figure 8:
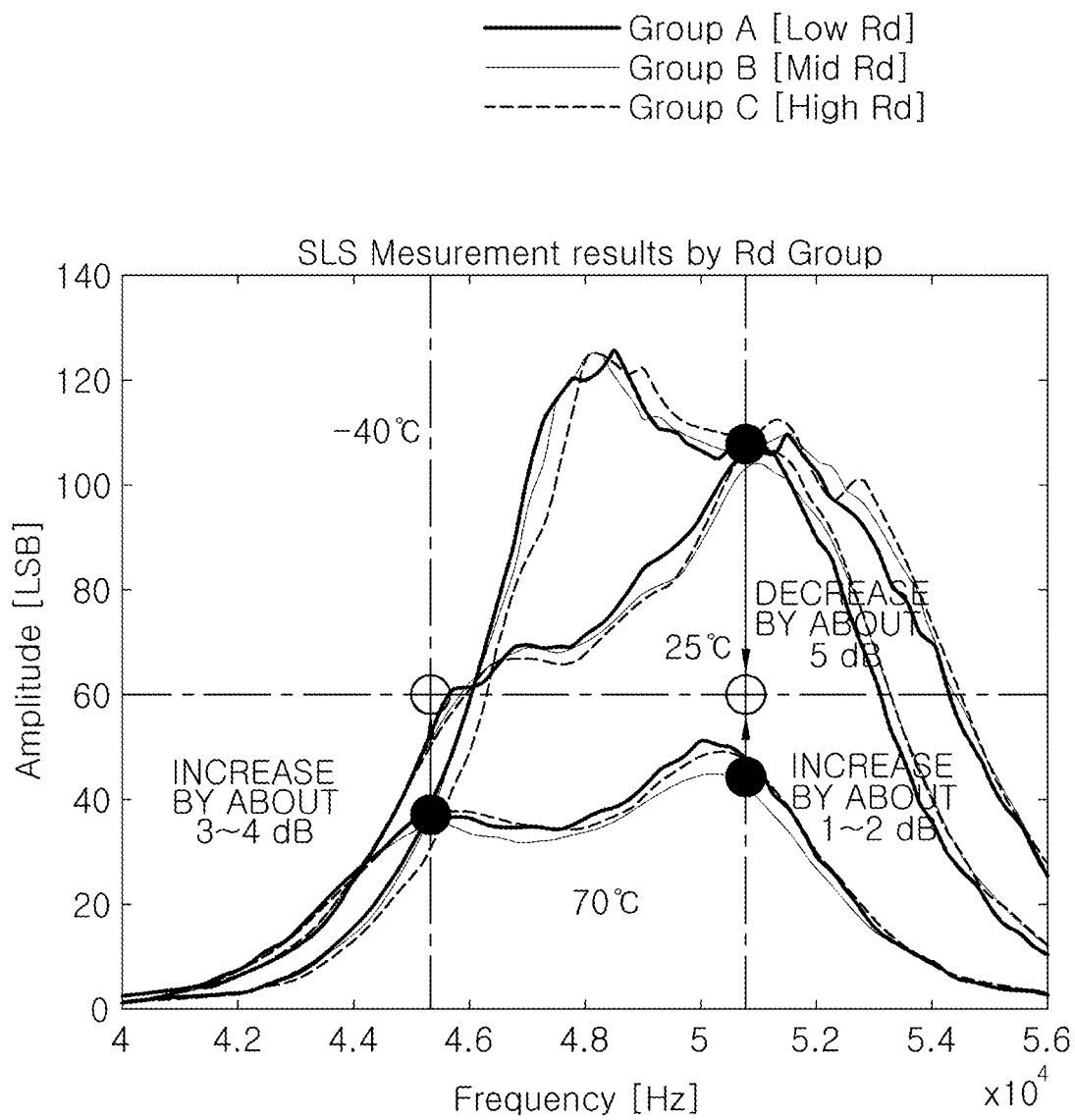
FIG. 8 is a graph showing adjustment results with reference sensitivity according to the sensed ultrasonic frequencies.

In addition, as shown in FIG. 8, the frequency/sensitivity characteristics of the ultrasonic sensor 100 may be such that the sensitivity may be even around the center frequency when the ultrasonic transducer 20 and the matching circuit are exactly matched and that the frequency/sensitivity characteristics may not be symmetrical on the right and left sides of the center frequency when component characteristics changes due to various factors such as the environment and the like cause a mismatch.

That is, when different frequencies around Fc are selected to drive the ultrasonic sensors, the difference in the sensor sensitivities at the different frequencies leads to the difference in sensitivities between the sensors. That is, the measurement needs to be performed after the sensitivities are adjusted to the same level.

In general, when an object is sensed using the ultrasonic sensor 100, the sensor sensitivity acts as an important factor. Accordingly, as shown in FIG. 8, when a plurality of frequencies is used, the control unit 200 may adjust the sensitivities at different frequencies to the sensitivity at the center frequency.

This allows the effect of accurately sensing an object even when a plurality of ultrasonic sensors 100 are driven using a plurality of frequencies.

FIG. 6 is a view showing mounting positions of the vehicle ultrasonic sensors 100 according to an embodiment of the present invention.

As shown in FIG. 6, a plurality of ultrasonic sensors 100 may be mounted in the vehicle and the control unit 200 may group adjacent ultrasonic sensors 100 among the plurality of ultrasonic sensors 100 and set the plurality of grouped ultrasonic sensors 100 to driving frequencies different from each other.

A plurality of ultrasonic sensors 100 may be provided on the front, rear, or side of the vehicle to assist the driver in driving. For example, a total of twelve ultrasonic sensors 100—six in the front half and six in the rear half—may be mounted, and four to twelve ultrasonic sensors 100 may be mounted depending on vehicle options or vehicle types.

If a plurality of ultrasonic frequencies is to be used, the ultrasonic sensors 100 need to have a wide frequency band. Since this increases cost, the control unit 200 may group a part of the adjacent ultrasonic sensors 100 among the plurality of ultrasonic sensors 100 and use two to three ultrasonic frequencies to drive the grouped ultrasonic sensors 100.

This allows the effect of shortening the sensing cycle compared to the conventional art as the grouped ultrasonic sensors 100 are driven using a plurality of frequencies.

For example, two frequencies may be used when the ultrasonic sensors 100 are grouped into two subgroups and three frequencies may be used when the ultrasonic sensors 100 are grouped into three subgroups. There is the effect of shortening the sensing cycle by half when two frequencies are used and by two-thirds when three frequencies are used.

The control unit 200 may set reference sensitivity of the frequency of the received ultrasonic waves and increase or decrease the frequency of the ultrasonic waves reflected and received from the target for sensing at the reference sensitivity.

Figure 7:
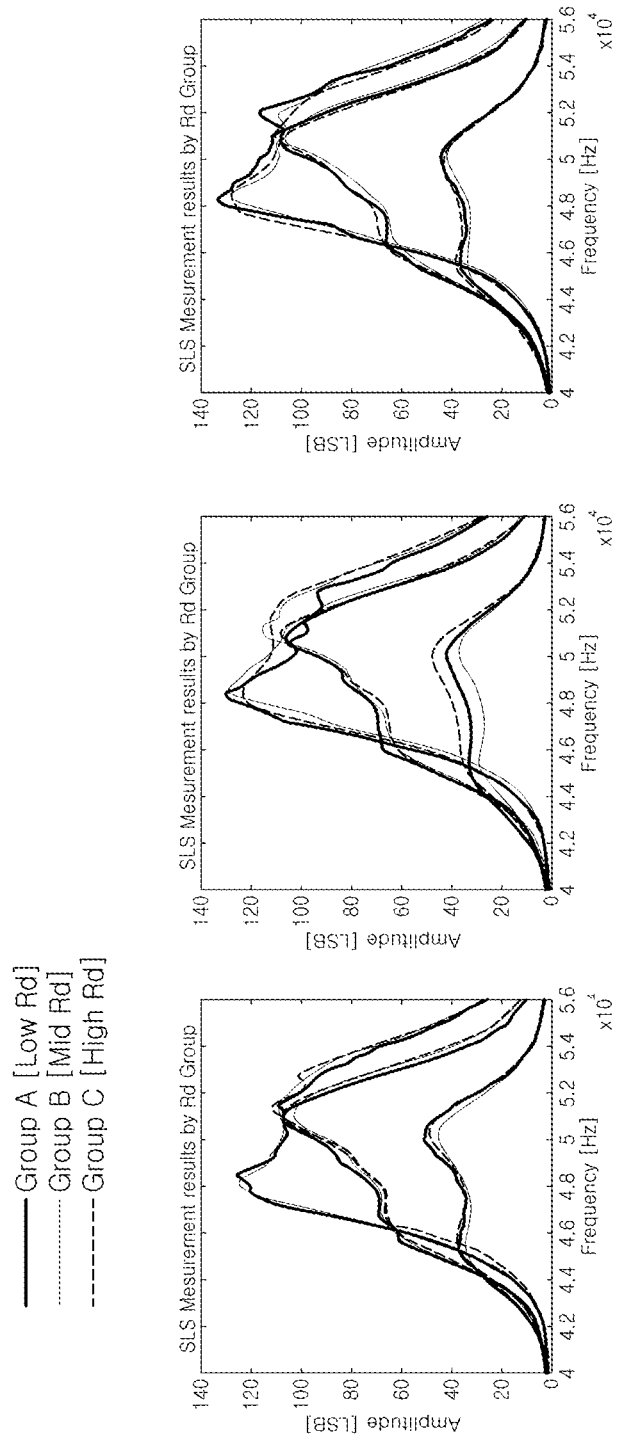
FIG. 7 shows graphs of frequency/sensitivity characteristics curves of selected min/max for major characteristics values of ultrasonic sensor transducers, respectively obtained at three temperatures (−40 degrees, +25 degrees, +70 degrees).

As shown in FIG. 7, the two sides may appear asymmetrical due to frequency sensitivity characteristics in general.

To the contrary, when a plurality of frequencies is used, the control unit 200 may adjust the amplitude of the center frequency to match the reference sensitivity by increasing or decreasing the amplitude of frequencies with respect to the reference sensitivity.

This allows the effect of accurately sensing a target even if a plurality of frequencies is used.

The control unit 200 may pre-map the component characteristics or temperature of the ultrasonic sensor 100, predict the sensor sensitivity at a specific frequency based on the pre-mapping, and convert the sensor sensitivity into the reference sensitivity for sensing.

The frequency/sensitivity characteristics of the ultrasonic sensor 100 may be determined by the characteristics of the ultrasonic transducer 20 and the matching circuit and may be subject to changes when the component characteristics change due to various factors (temperature, part obsolescence).

As shown in FIG. 7, of the ultrasonic sensitivity characteristics, A, B, and C are graphs showing frequency/sensitivity characteristics of selected min/max for major characteristic values of the ultrasonic transducer 20 of each ultrasonic sensor 100, and difference resulting from the temperature difference remains the same despite the difference in the characteristics of the ultrasonic transducer 20.

Accordingly, the control unit 200 may pre-map sensitivity adjustment values according to the component characteristics or temperature of the ultrasonic sensor 100 and adjust the frequency sensitivity based on the pre-mapping to allow reception of sensed information.

Figure 9:
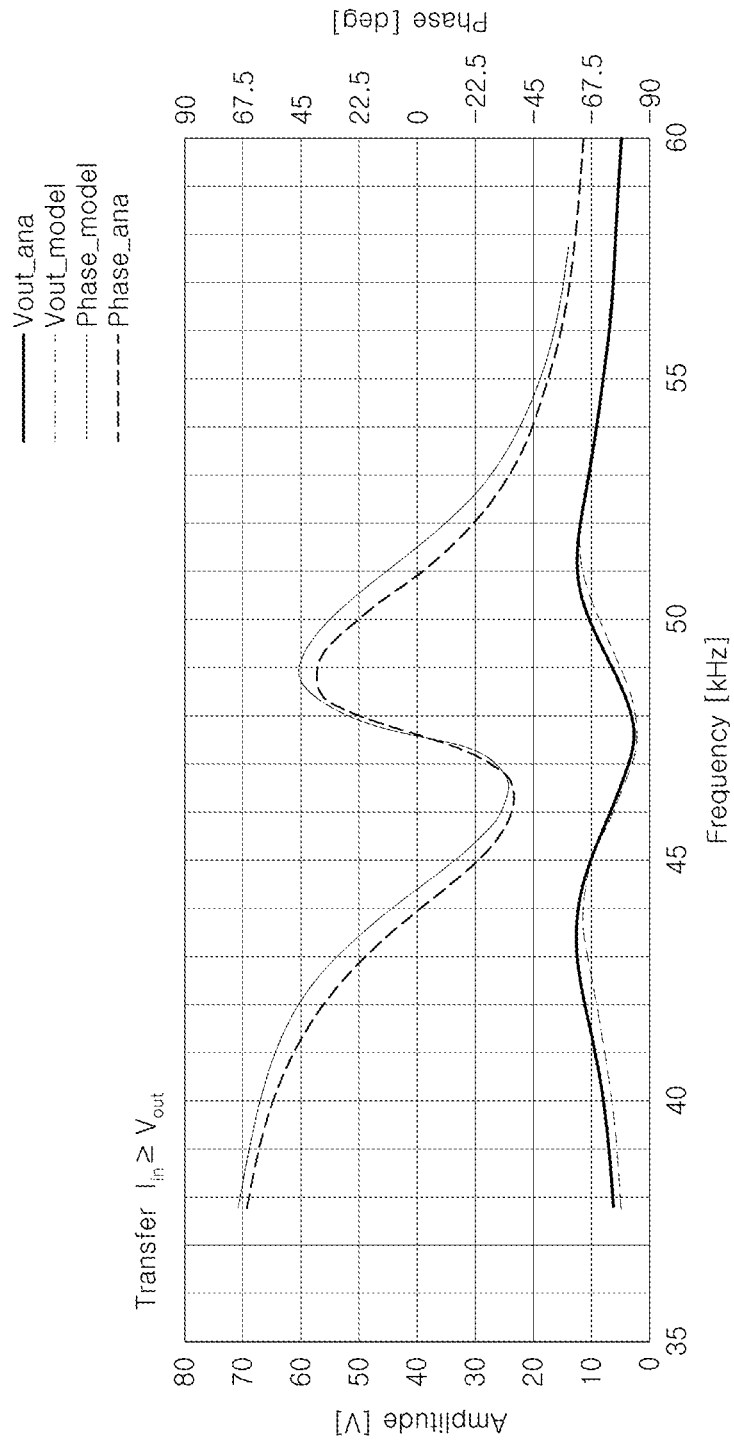
FIG. 9 is a graph showing a transfer function and a phase curve of the ultrasonic sensor through sensor diagnosis.

FIG. 9 is a graph showing a transfer function and a phase curve of the ultrasonic sensors 100 through sensor diagnosis.

A sensor diagnosis unit 300 diagnosing the ultrasonic sensor 100 and calculating the transfer function of the ultrasonic sensor 100 may be further included, and the control unit 200 may predict an element value of the ultrasonic sensor 100 in an equivalent circuit based on a transfer function of the ultrasonic sensor 100 calculated by the sensor diagnosis unit 300 and convert the element value into the reference sensitivity for sensing.

Adjustment of the frequency sensitivity based on the pre-mapping poses a problem that the characteristics of the ultrasonic transducer 20 and the matching circuit change by much more than the values expected at the time of pre-mapping, and further, factors such as component obsolescence and the like may change more greatly with respect to the initial management value.

In order to address this issue, the sensor diagnosis unit 300 may diagnose the ultrasonic sensor 100 and calculate the transfer function, and the control unit 200 may adjust the sensitivity of the ultrasonic sensor 100 to the reference sensitivity by inferring the value of element on the equivalent circuit that the ultrasonic transducer 20 and the matching circuit take based on the calculated transfer function.

Figure 10:
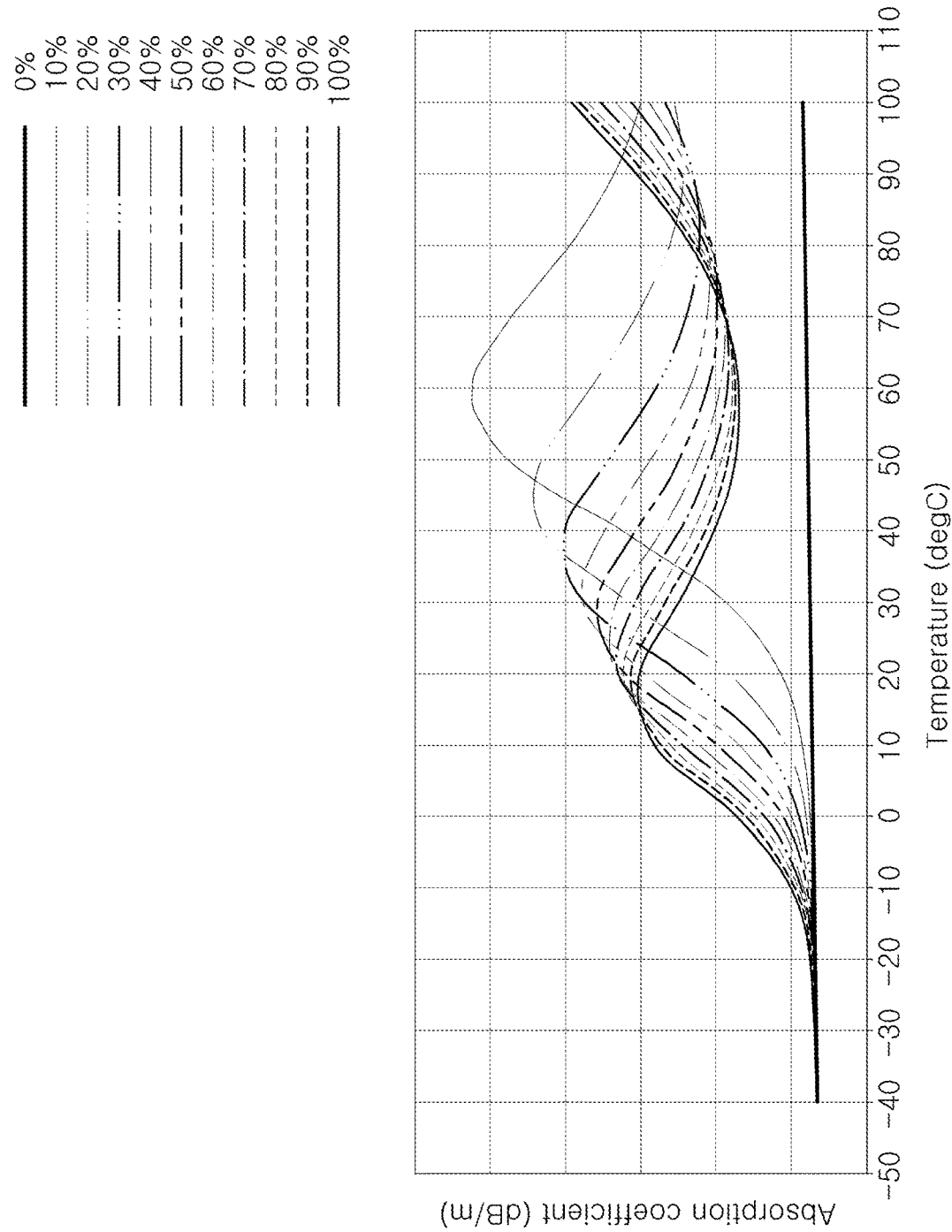
FIG. 10 is a graph showing changes in the attenuation coefficient of ultrasonic waves in the air according to temperature/humidity under the condition of the same frequency/atmospheric pressure.

FIG. 10 is a graph showing changes in the attenuation coefficient of ultrasonic waves in the air according to temperature/humidity under the condition of the same frequency/atmospheric pressure.

A sensing unit 400 sensing the outside temperature or humidity through which the ultrasonic waves generated by the ultrasonic sensor 100 are transmitted may be further included, and the control unit 200 may calculate an attenuation coefficient of the ultrasonic waves in the air according to the temperature or humidity sensed by the sensing unit 400 and convert the attenuation coefficient into the reference sensitivity for sensing.

The ultrasonic waves are attenuated according to the state of the medium (air and the like) at the time of generation. In particular, since the ultrasonic waves are affected by the factors (temperature, humidity, atmospheric pressure, frequency) of the medium, it is necessary to consider the characteristics of the medium after adjustment is performed based on the pre-mapping or the sensor diagnosis.

As shown in FIG. 10, since the attenuation coefficient of the ultrasonic waves in the air changes according to the temperature and humidity, the sensing unit 400 may sense the temperature or humidity of the air and the control unit 200 may adjust the sensitivity of the ultrasonic sensor 100 based on the sensed temperature or humidity.

This allows the effect of accurately adjusting the frequency sensitivity of the ultrasonic sensor 100 through several steps.

The control unit 200 may perform sensitivity adjustment of each ultrasonic sensor 100 when the ultrasonic sensor 100 starts operation or when the vehicle gear is shifted.

The control unit 200 may perform sensitivity adjustment of the ultrasonic sensor 100 when the vehicle is started or when the vehicle gear is shifted into drive or reverse.

This allows the effect of stably receiving the signal of the ultrasonic sensor 100 by adjusting the sensitivity of the ultrasonic sensor 100 in response to the ever-changing environment of the vehicle.

FIG. 11 is a flowchart of a vehicle ultrasonic sensor 100 control method according to the present invention.

Preferable embodiments of the vehicle ultrasonic sensor 100 control method according to the present invention will be described with reference to FIG. 11.

The vehicle ultrasonic sensor 100 control method according to the present invention includes setting a plurality of driving frequencies with a guard-band located therebetween (S11); controlling so that a plurality of ultrasonic sensors 100 emit and receive ultrasonic waves having the set driving frequencies different from each other (S12); and compensating the sensitivity of the ultrasonic wave reflected and received from the target for sensing the target (S50).

Grouping adjacent ultrasonic sensors 100 among a plurality of ultrasonic sensors 100 (S10) before the setting of the driving frequencies may be further included and the plurality of grouped ultrasonic sensors 100 may be set to the driving frequencies different from each other in the controlling.

Setting the reference sensitivity of the received ultrasonic waves and increasing or decreasing the frequency of the ultrasonic waves reflected and received from the target for sensing at the reference sensitivity (S54) may be included in the sensing of the target (S50).

Pre-mapping the component characteristics or temperature of the ultrasonic sensor 100 (S20) may be further included, and predicting the sensor sensitivity at a specific frequency based on the pre-mapping and converting the sensor sensitivity into the reference sensitivity (S51) may be included in the sensing of the target (S50).

Diagnosing the ultrasonic sensor 100 and calculating the transfer function of the ultrasonic sensor 100 (S30) may be further included, and predicting the element value of the ultrasonic sensor 100 in the equivalent circuit based on the transfer function of the ultrasonic sensor 100 calculated by the sensor diagnosis unit 300 and converting the element value into the reference sensitivity for sensing (S52) may be included in the sensing of the target (S50).

Sensing the outside temperature or humidity through which the ultrasonic waves generated by the ultrasonic sensor 100 are transmitted (S40) may be further included, and calculating the attenuation coefficient of the ultrasonic waves in the air according to the sensed temperature or humidity and converting the attenuation coefficient into the reference sensitivity for sensing (S53) may be included in the sensing of the target.

The specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A system for controlling a vehicle ultrasonic sensor, comprising:
a plurality of ultrasonic sensors attached to a vehicle, each ultrasonic sensor including (1) an ultrasonic transducer configured to generate ultrasonic waves and (2) a control module configured to control a driving frequency of the ultrasonic waves emitted from the ultrasonic transducer; and
a control unit configured to (1) set a plurality of driving frequencies with a guard-band located therebetween and (2) control the control module such that each ultrasonic sensor emits and receives the ultrasonic waves, some sensors having a driving frequency different from that of the ultrasonic waves emitted and received from other ultrasonic sensors;
wherein:
the plurality of ultrasonic sensors is divided into a plurality of ultrasonic sensor groups, each ultrasonic sensor group comprising a plurality of ultrasonic sensors positioned adjacent to each other, and
the control unit is configured to set the driving frequency of each ultrasonic sensor group to be different from each other;
wherein:
the control module includes a filter with a cutoff frequency set to filter the received ultrasonic waves, and
the control unit is configured to set the guard-band based on a characteristic of the filter; and
wherein:
the filter includes a bandpass filter passing frequencies only within a preset frequency bandwidth, and
the control unit is configured to set a bandwidth frequency of the guard-band to a value greater than the preset frequency bandwidth of the bandpass.

2. The system of claim 1, wherein the preset frequency band of the bandpass filter comprises frequencies in a frequency band in which voltage transduced in the ultrasonic transducer is reduced by half.

3. The system of claim 1, wherein the preset frequency band in the bandpass filter is preset based on a Q factor and a center frequency of a frequency of the ultrasonic waves.

4. The system of claim 1, wherein:
the filter includes a matched filter configured to determine whether the driving frequency of the received ultrasonic waves is a valid frequency based on common elements between a preset reference frequency and the driving frequency of the received ultrasonic waves, and
the control unit is configured to set the guard-band based on the preset reference frequency.

5. The system of claim 1, wherein the control unit is configured to select and set a plurality of frequencies at a driving frequency point.

6. The system of claim 1, wherein the control unit is configured to perform frequency modulation to set the plurality of frequencies.

7. The system of claim 1, wherein the control unit is configured to compensate a sensitivity of the ultrasonic waves reflected by and received from a target and control the control module for sensing the target.

8. The system of claim 7, wherein the control unit is configured to:
set a reference sensitivity of the frequency of the received ultrasonic waves; and
increase or decrease the frequency of the ultrasonic waves reflected by and received from the target for sensing at the reference sensitivity.

9. The system of claim 8, wherein the control unit is configured to:
pre-map component characteristics or temperature of the ultrasonic sensor;

predict the sensor sensitivity at a specific frequency based on the pre-mapping; and convert the sensor sensitivity into the reference sensitivity.

10. The system of claim 8, further comprising a sensor diagnosis unit configured to diagnose the ultrasonic sensor and calculate a transfer function of the ultrasonic sensor, wherein the control unit is configured to predict an element value of the ultrasonic sensor in an equivalent circuit based on the transfer function of the ultrasonic sensor calculated by the sensor diagnosis unit and convert the element value into the reference sensitivity.

11. The system of claim 8, further comprising a sensing unit configured to sense an outside temperature or humidity of air around the vehicle through which the ultrasonic waves generated by the ultrasonic sensor are transmitted, wherein the control unit is configured to calculate an attenuation coefficient of the ultrasonic waves in the air according to the sensed outside temperature or humidity, and convert the attenuation coefficient into the reference sensitivity.

12. A method of operating a vehicle ultrasonic sensor for sensing a target, comprising:

setting a plurality of driving frequencies for a plurality of ultrasonic sensors, wherein the plurality of driving frequencies are separated from each other with a guard-band located therebetween;

controlling the plurality of ultrasonic sensors to emit and receive ultrasonic waves, wherein the ultrasonic waves emitted from and received by each ultrasonic sensor have a driving frequency different from that those of the ultrasonic waves emitted from and received by other ultrasonic sensors;

setting the guard-band based on a characteristic of a filter, the filter having a cutoff frequency set to filter the received ultrasonic waves and including a bandpass filter passing frequencies only within a preset frequency bandwidth;

setting a bandwidth frequency of the guard-band to a value greater than the preset frequency bandwidth of the bandpass;

compensating a sensitivity of the ultrasonic waves reflected by and received from the target; and sensing the target based on the compensated sensitivity of the ultrasonic waves reflected by and received from the target.

13. The method of claim 12, further comprising dividing the plurality of ultrasonic sensors into a plurality of ultrasonic sensor groups, each ultrasonic sensor group comprising a plurality of those of the ultrasonic sensors positioned adjacent to each other, wherein each ultrasonic sensor group is configured to operate with a driving frequency different from those of the other ultrasonic sensor groups.

14. The method of claim 12, wherein sensing the target comprises:

setting a reference sensitivity for the driving frequency of the received ultrasonic waves; and increasing or decreasing the driving frequency of the ultrasonic waves reflected by and received from the target for sensing at the reference sensitivity.

15. The method of claim 14, further comprising pre-mapping a component characteristic or temperature of the ultrasonic sensor, wherein sensing the target further comprises:

predicting the sensor sensitivity at a specific frequency based on the pre-mapping; and converting the sensor sensitivity into the reference sensitivity.

16. The method of claim 14, further including diagnosing the ultrasonic sensor and calculating a transfer function of the ultrasonic sensor, wherein sensing the target comprises:

predicting an element value of the ultrasonic sensor in an equivalent circuit unit based on the calculated transfer function; and converting the element value into the reference sensitivity.

17. The method of claim 14, further comprising sensing an outside temperature or humidity of air around a vehicle, through which the ultrasonic waves generated by the ultrasonic sensor are transmitted, wherein sensing the target comprises:

calculating an attenuation coefficient of the ultrasonic waves according to the sensed temperature or humidity; and converting the attenuation coefficient into the reference sensitivity.

\* \* \* \* \*